UNITED STATES PATENT OFFICE.

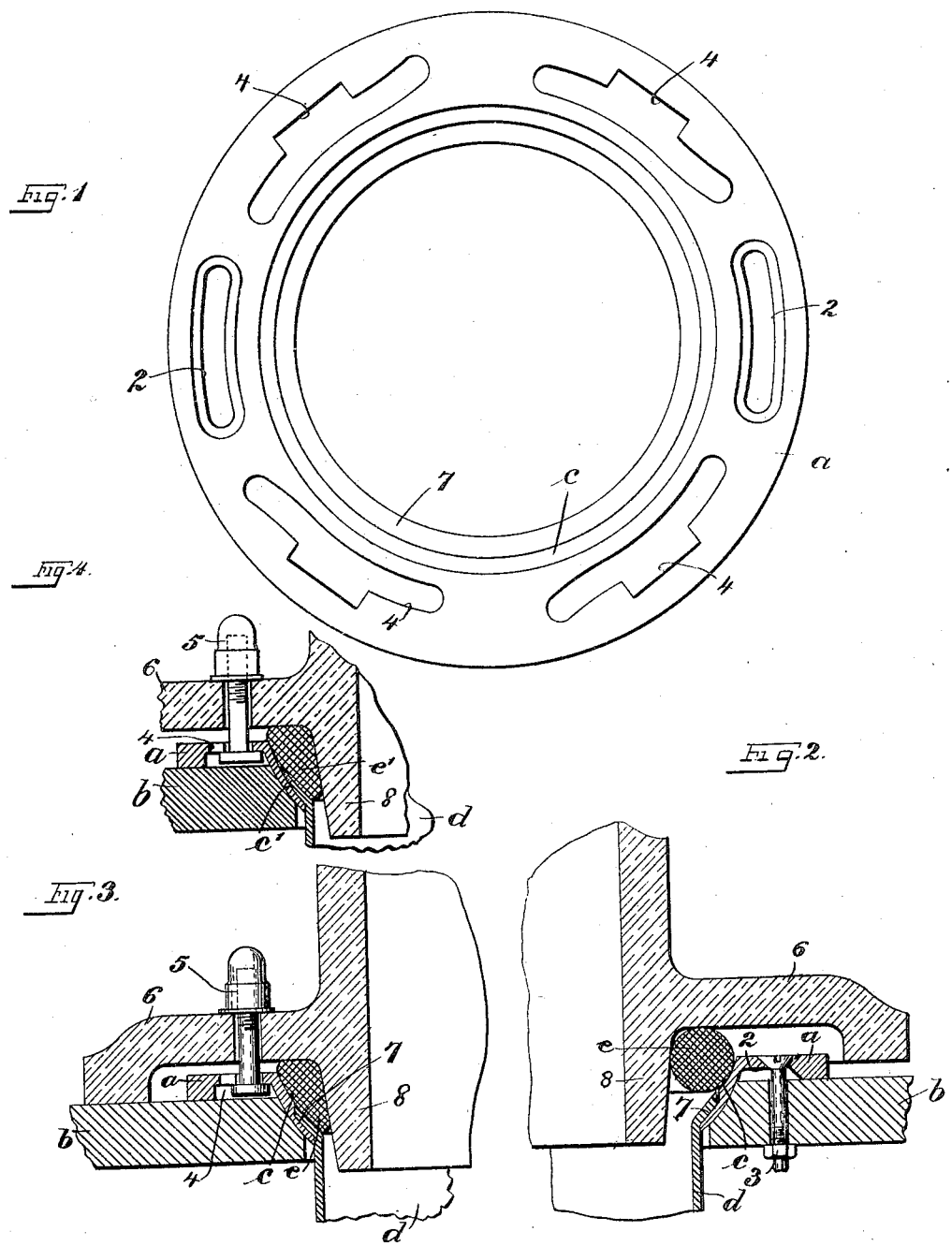

ARCHIBALD BUCHANAN, JR., OF NEW YORK, N. Y.

FLOOR-FLANGE FOR WATER-CLOSET BOWLS.

No. 812,543.  Specification of Letters Patent.  Patented Feb. 13, 1906.

Application filed April 19, 1905. Serial No. 256,376.

*To all whom it may concern:*

Be it known that I, ARCHIBALD BUCHANAN, Jr., a citizen of the United States, residing in the borough of Brooklyn, city and State of New York, have invented an Improvement in Floor-Flanges for Water-Closet Bowls, of which the following is a specification.

My invention relates to floor-flanges for water-closet bowls; and the object thereof is the adaptation of the floor-flange to receive and to be securely fastened to the upper end of the soil-pipe in such a manner that the gasket employed between the closet-flanges and the floor-flange when the closet is set up shall completely cover the joint of the floor-flange and soil-pipe and fill the space between these parts and the closet-flanges.

In carrying out my invention I employ a floor-flange provided with slots for the bolts securing the flange to a floor or a slab thereon and undercut slots for the reception of the bolts by which the closet-bowl is secured to the floor-flange and a central depending collar integral with the floor-flange and having the inner upper surface adjacent to its extremity provided with a cut-away portion into which the upper end of the soil-pipe is fitted and soldered in such a position that when the closet-bowl is set the gasket employed completely covers the joint between the soil-pipe and collar of the floor-flange and fills the space between these parts and the closet-flanges, thus making the joint sewer-gas tight in both directions.

In the drawings, Figure 1 is a plan of my improved floor-flange. Fig. 2 is a partial sectional elevation showing the relation of the parts for making the joint before the closet-bowl is set. Fig. 3 is a similar view showing the relative positions after the closet-bowl is set, and Fig. 4 is a partial sectional elevation showing a modified form of my invention.

$a$ represents my improved floor-flange, which I provide with slots 2 for the reception of bolts 3 or other means by which the floor-flange may be secured to a suitable slab, base, or floor $b$ and with undercut slots 4 for the reception of the heads of bolts 5 or other means passing through the closet-flange 6 and by which the closet-bowl is set in position and secured to the floor-flange. This floor-flange is provided with an integral annular depending and inclined member or beveled collar $c$, whose inner upper surface at its outer extremity is provided with a cut-away portion 7. The smaller diameter of the collar $c$ is approximately that of the exterior diameter of the soil-pipe $d$, whose upper end is passed through the collar the required distance and turned down by suitable tools into the cut-away portion 7 of the inner surface of the collar $c$, where solder or brazing material is employed between the side of the cut-away portion 7 and the turned-over end of the soil-pipe to form a secure and permanent joint, which afterward may be suitably dressed off, if desired.

The inner surface of the collar $c$ may be slightly concave or straight, and when the soil-pipe has been connected as described a seat is formed for a gasket $e$ of suitable flexible material which surrounds the discharge-nozzle 8 of the closet-bowl. Now when the closet is forced to its seated position it will be apparent that the gasket will be caused to assume the position shown in Fig. 3, completely covering the joint between the soil-pipe and the collar of the floor-flange and filling the space between the same and the flange 6 and discharge-nozzle 8 of the closet, and so forming the joint between the closet and the soil-pipe, which is sewer-gas tight in both directions.

The permanent union of the soil-pipe and floor-flange, aided by the weight of the soil-pipe, assists in a measure the stability of the closet upon the flange and slab. I have shown and prefer that in its initial form the gasket be round in cross-section, and this gasket is most advantageously made of asbestos and plumbago, because of the conformability of such materials to adjacent confining-surfaces as well as for the lasting qualifications of the materials.

In the modified form of my invention shown in Fig. 4 the inner surface of the collar $c'$ of the floor-flange instead of being cut away or offset, as shown in Figs. 2 and 3, may be a continuous curve, the soil-pipe being received within the collar and its upper end bent outwardly over against the collar. In this event solder or brazing material is applied not only between the contiguous surfaces of the soil-pipe and collar, but between the end of the pipe and the adjacent surface of the collar, so as to form a continuous surface of the surface of the collar, the pipe, and the solder filling, upon which and over the line of union the gasket $e'$ may rest and be caused to fit and fill when the closet is forced down to place.

I claim as my invention—

1. A water-closet floor-flange having a dishing collar, the lower portion of whose inner surface is offset or depressed and into which the upper end of the soil-pipe is to be received and bent over and then secured by solder.

2. A floor-flange for soil-pipe connections for water-closet bowls, having a central depending collar provided at its inner lower edge with a cut-away portion.

3. A floor-flange for soil-pipe connections for water-closet bowls having a central integral depending collar whose inner surface is concave and provided at its inner lower edge with a cut-away portion.

4. A floor-flange for soil-pipe connections for water-closet bowls provided with series of slots for connections respectively to the slab and closet-bowl and having a central integral depending collar whose inner surface is concave and provided at its inner lower edge with a peripheral cut-away portion.

5. A floor-flange for soil-pipe connections for water-closet bowls, having a central integral depending collar whose inner surface is concave and provided at its inner lower edge with a peripheral cut-away portion adapted to receive the upper end of the soil-pipe in such a manner that the gasket employed to form the joint between the floor-flange and the closet-flanges will completely cover the joint between the floor-flange and the soil-pipe and extend between the same and the said closet-flanges.

6. A water-closet floor-flange having a central dishing collar, the inner surface of which inclines downward and upon the lower portion of which surface the outwardly-bent-over upper end of the soil-pipe is received and secured by solder which also overlies sufficient of the surface of the collar and pipe as to make a continuous surface upon which surface and over which union the gasket extends.

Signed by me this 14th day of March, 1905.

ARCHIBALD BUCHANAN, JR.

Witnesses:
GEO. T. PINCKNEY,
S. T. HAVILAND.